Dec. 5, 1961 P. C. HUNGERFORD, JR., ET AL 3,011,605
NO-BACK COUPLING MECHANISM
Filed July 24, 1958 2 Sheets-Sheet 1
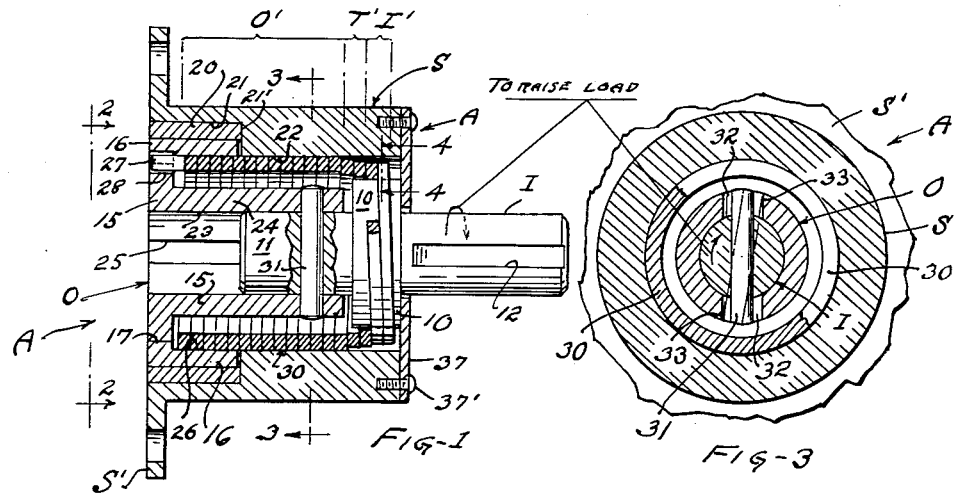
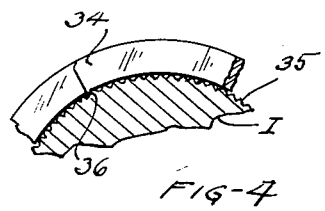
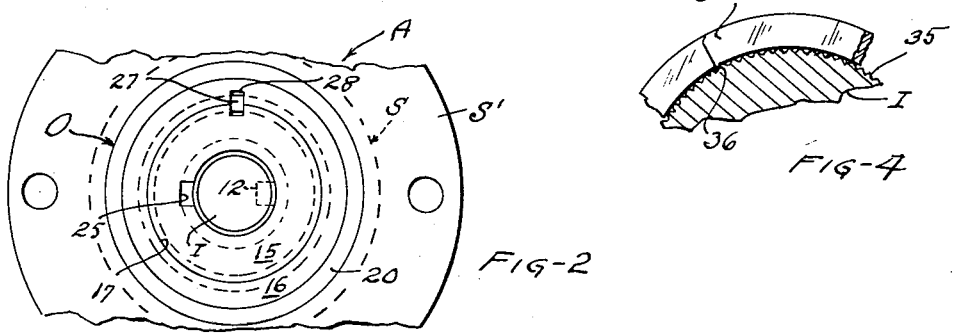
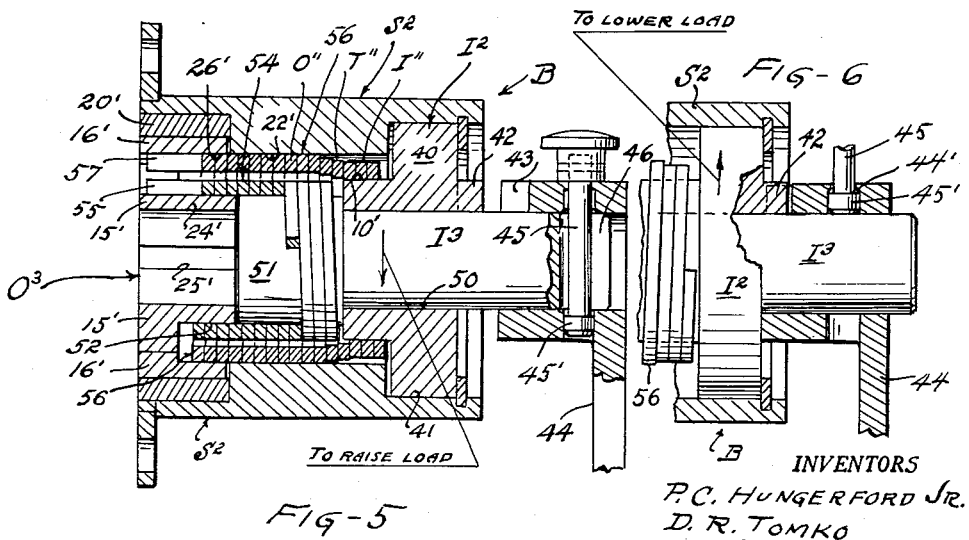
INVENTORS
P.C. HUNGERFORD JR.
D. R. TOMKO
By George M. Soule
ATTORNEY Dec. 5, 1961 P. C. HUNGERFORD, JR., ET AL 3,011,605
NO-BACK COUPLING MECHANISM
Filed July 24, 1958 2 Sheets-Sheet 2
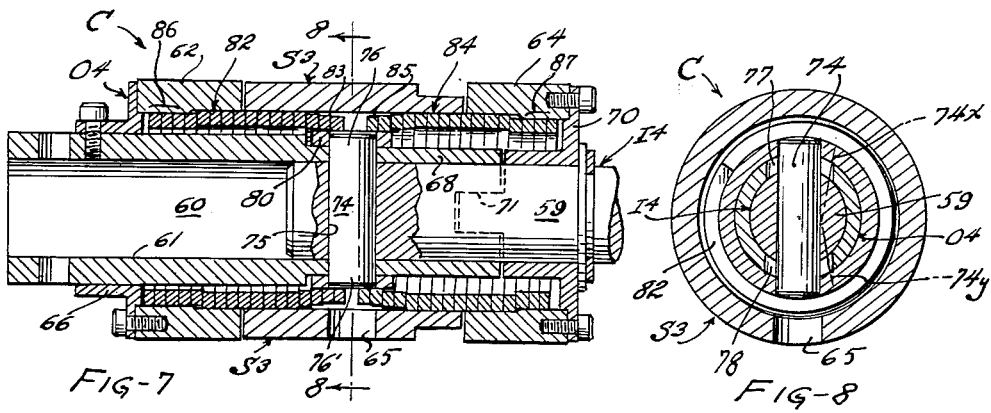
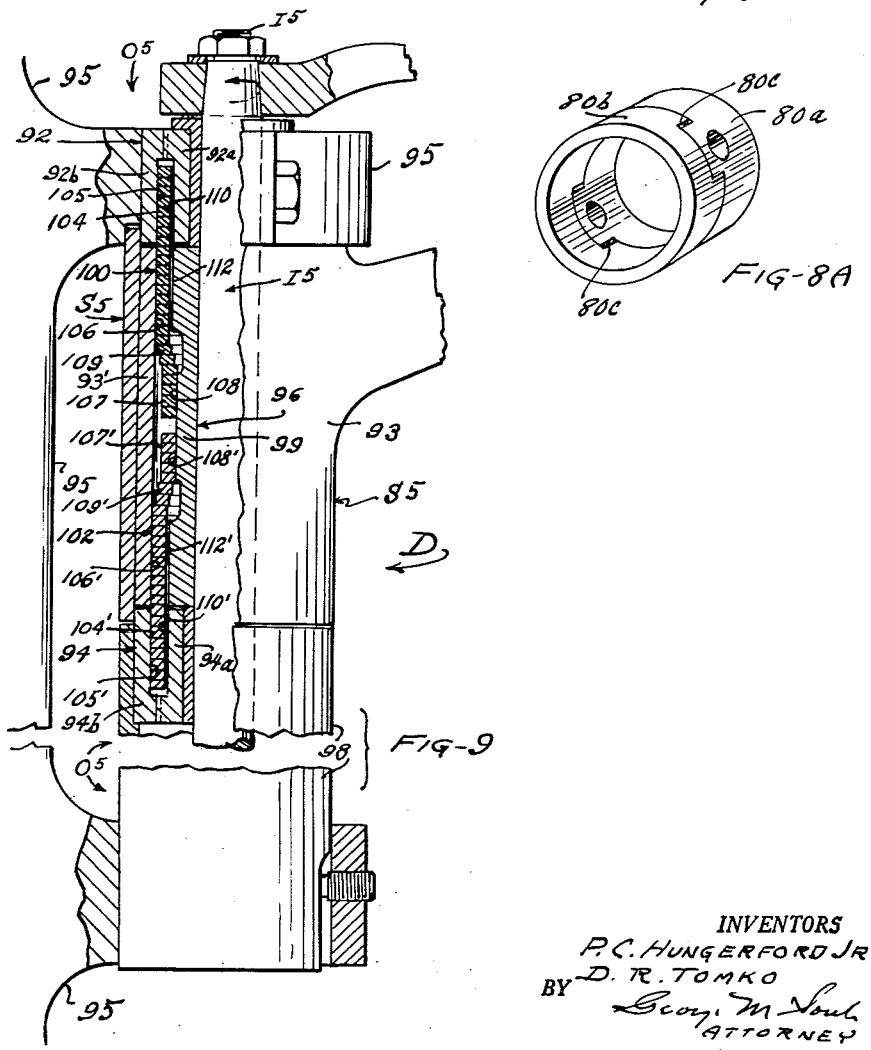
INVENTORS
P. C. HUNGERFORD JR.
D. R. TOMKO
BY
ATTORNEY

United States Patent Office 3,011,605
Patented Dec. 5, 1961

3,011,605
NO-BACK COUPLING MECHANISM
Philip C. Hungerford, Jr., Cleveland Heights, and Donald R. Tomko, Cleveland, Ohio, assignors to Curtiss-Wright Corporation, a corporation of Delaware
Filed July 24, 1958, Ser. No. 750,782
16 Claims. (Cl. 192—8)

The present invention relates to a no-back coupling mechanism of the type employing self energizing helical friction spring members operable as brake elements against normally stationary drums so as to be capable of enabling transmission of torque as from a control or input shaft or member to a load-connected element or shaft while effectually preventing back drive in at least one angular direction from the load-connected element to the control or input shaft or member.

Usually hereinafter, embodiments of the present invention designed to serve as unidirectional no-back couplings will be referred to as UDNB units; and embodiments designed to serve as bi-directional no-back units will be designated BDNB.

An important problem in the manufacture of no-back couplings using helical friction springs coacting with normally stationary drums as brake elements is that of avoiding excessive built-in backlash or free play while making certain that the spring or springs will withstand or transmit rated torque and will always be released as necessary by operation of the input shaft or member in order to turn the output shaft or member. One reason why most no-back couplings have an undesirable amount of backlash is that the control or abutment surfaces on the spring or springs such as are usually provided must have critical angular relationships to control shoulders or energizing and deenergizing abutments on the input and output members. An object of the present invention is to provide UDNB and BDNB couplings in which provision of precisely angularly related energizing and deenergizing abutment surfaces can be avoided, wherefore the two ends of each of the springs may vary freely in angular relationship about the axis of the springs without likelihood of causing malfunctioning. A further object is to obviate the necessity for control lugs or shoulders in no-back couplings, particularly on the input-associated end portions of the spring or springs.

An important object hereof is to provide UDNB or BDNB couplings in which initial movement of an input shaft or member out of neutral or stopped position will be immediately yieldably resisted; and a concomitant object is to provide such couplings wherein the input shaft or member, after its work-performing movement is resiliently and effectually returned to neutral position.

A further object is to provide a no-back coupling, including a helical friction spring or pair of springs and cooperating drum or drums, wherein relatively light loads can be carried or transmitted torsionally by the spring or springs (assisted only when necessary by one-way-locking frictional action of the spring or springs on or in a cooperating drum or pair of drums).

Objects and novel features of the invention not indicated above will become apparent from the following description of the preferred forms as shown in the drawings. The essential characteristics are summarized in the claims.

"Clockwise" in describing angular movement of elements of assemblies hereof not shown by end or transverse sectional views is to be understood as referring to the motions of the elements involved when viewed from right toward left or top toward bottom. "Floating" as applied to helical springs means that the spring involved is unconnected wtih an associated drum except by friction, wherefore the spring can overrun on such associated drum. A "full floatng" spring means one that is unconnected except by friction with two associated drums. "Elastically preloaded" in reference to a helical spring on coacting drum or drums means interference fitted.

In the drawings:

FIG. 1 is a central longitudinal cross sectional view of a UDNB unit (A) incorporating the present invention.

FIGS. 2 and 3 respectively, are end and transverse sectional views respectively as conventionally indicated in association with FIG. 1.

FIG. 4 is a relatively enlarged fragmentary sectional view taken for example as indicated at line 4—4 in FIG. 1 showing a helical spring and cooperating drum such as may be employed if desired in the practice of the present invention in any of the illustrated forms thereof.

FIG. 5 is a longitudinal central sectional view corresponding to FIG. 1 showing a UDNB coupling unit (B) designed to serve in a winch or hoist mechanism and having provision for selective input operation including ratchet action through the intermediary of two helical springs arranged in parallel operating relationship to one output member and two input members. FIG. 5 shows the unit B conditioned for ratchet action.

FIG. 6 is a fragmentary longitudinal sectional view according to FIG. 5 but showing unit B conditioned for UDNB coupling operation.

FIG. 7 is a central longitudinal cross sectional view showing another embodiment (C) of the invention designed for BDNB operation.

FIG. 8 is a transverse cross sectional view as indicated on FIG. 7.

FIG. 8A is a perspective view showing a modified control member for input ends of two helical springs as in FIG. 8.

FIG. 9 is a fragmentary central longitudinal sectional view showing another BDNB unit (D) having further modifications.

UDNB coupling unit A

In FIG. 1 the input shaft or member I of unit A has a generally cylindrically enlarged diameter control or clutch drum portion 10, and a relatively reduced diameter pilot extension 11 therebeyond (right toward left) inside a normally stationary housing member S. The housing has an attaching flange S' for securing the coupling unit A to the frame of a hoist for example (not shown). Input member I has a conventional keyway 12 for connection of a crank, power driven shaft or other torque transmitting means, not shown, to the coupling A. Output member or assembly O of the coupling A, as shown, is made of two rotationally integral inner and outer parts 15 and 16 slip-fitted together at a suitable cylindrical joint 17. The outer part 16 of output member O is tightly fitted into a bearing ring or bushing 20 which, in turn, is rotatably received and supported in a counterbore 21 of the normally stationary housing S. The housing has a reduced diameter through bore 22 extending to the right from the effective bottom 21' of the counterbore 21, and the major portion of the length of the bore 22 serves as a fixed no-back brake drum surface.

The cylindrical pilot extension 11 of input shaft or member I is turnably supported in a through bore 23 of a tubular or sleeve portion 24 of inner output member or assembly part 15, shown as having a keyway 25 for load coupling or attachment purposes. The various cylindrical surfaces identified above are, as usual in no-back couplings, coaxial.

Helical clutch and brake spring 30 has a main group of coils, identified O' in FIG. 1, in bridging relation to stationary or brake drum surface 22 and to a corresponding inner drum surface 26 of the outer output part or portion 16. Coils O' are elastically preloaded for one-way locking self energizing contact with stationary drum surface 22 while being capable of overrunning on said surface. Other coils O' of the spring associated with the internal output drum surface 26 can be effectually anchored to the output drum member O solely by especially heavy elastic preloading on a portion of the drum surface 26 of output part 16, and additionally if desired the terminal leftward end coil O' of the spring has an axial toe portion 27 seated in a keyway 28 formed partly in output part 15 and partly in output part 16. Thereby the two parts 15 and 16 of the output member or assembly are integrally locked together through the intermediary of the spring toe 27. Additional securing means between parts 15 and 16 may of course be provided.

For operation of the coupling A as in a hoist, by rotation of the input member in a clockwise direction indicated by an arrow in FIG. 3 to lift a load, the helical spring 30 is right hand wound or as partially shown in FIG. 1. When the spring 30 is formed as by conventional automatic winding or coiling methods, one or more control coils I' at the input end portion of the spring 30 are made considerably smaller in diameter than the main coils O', and the control coils I' are especially heavy elastically preloaded for anchorage on input control drum surface portion 10. Thus the coils I' in the operation of the input member I counterclockwise are strongly self energizing on the input drum surface 10 to contract the control coils I' onto that drum. That same (counterclockwise) direction of input member operation also tends to contract the stationary-drum-associated coils O' so as to release those coils from gripping or one-way-locking contact with the stationary drum surface 22 by acting through the intermediary of the transitional coil portion T'. There are preferably from one and one half to two transitional coils, and these as preferably formed have gradually increasing diameters or diametral dimensions from right toward left, FIG. 1.

It will be apparent that when no torque is being transmitted through the coupling A, a predetermined circumferential length of the transitional coil portion T' of the spring 30 will be free from contact with the external input drum surface 10 as well as free from contact with the internal stationary drum surface 22. During transmission of torque either to raise or lower the load, some of the normally non-contacting transitional coil portions T' of the spring will make contact with associated drum surfaces, but there is ordinarily very little net change. In other words, as peripheral surface portions of the transitional coil or coils T' become further seated on the input drum surface 10, other peripheral surface portions of the transitional coils T' will become unseated in reference to the stationary drum surface 22.

Assuming the output member O is connected to an overhauling load, the counterclockwise operation of the input member I is solely permissive (i.e. load is permitted to descend in a controlled manner with only sufficient input applied force to maintain deenergization of the coils O' in respect to the stationary drum surface 22). In order to raise such load, the helical spring 30 must be deenergized from the end thereof opposite the inputdrum-associated or control coils I'; and this operation (in unit A) is accomplished by provision of a positive torque transmitting limited lost motion connection between the input member I and the output member O. As shown in FIGS. 1 and 3 the lost motion connection comprises a cross pin 31 snugly fitted in a cross bore of pilot extension 11 of input member I, the end portions of the cross pin being received freely in diametrally disposed circumferentially elongated slots 32 in the output member sleeve portion 24.

During assembly of the coupling, after the cross pin 31 is pressed into place thereby permanently interconnecting the inner output or sleeve part 15 and the input member I, the reduced diameter rightward end or control coils I' of the spring 30 are forced over the input or control drum surface 10, and the spring toe 27 is seated in the portion of its keyway which is contained by the inner output part 15. The previously press fitted together bearing bushing 20 and outer output member part 16 are then forced, left toward right, over the leftward spring coils O' and the then completed input and output member and spring sub-assembly is slid and/or turned and forced into final position in the housing S or to the position shown in FIG. 1. During the above described operations of assembling the spring onto its cooperating parts and particularly during insertion of the spring coils O' into the housing S, the cross pin 31 is maintained in proper position intermediately of the ends of the slot 32 by a holding fixture (not shown) engaging the keyways 12 and 25 in the input and output members respectively. The rotatable parts of the coupling are prevented from movement to the left (FIG. 1) by any suitable means (e.g. hoist framework, not shown), and rightward movement is prevented by a cap 37 secured as by screws or other suitable fasteners 37'.

The transitional coil portion T' of the helical spring 30, in a neutral condition of the coupling (no input torque), holds the cross pin 31 in a position such as illustrated by full lines in FIG. 3 or with the cross pin end portions intermediately of the ends of the slot 32. Upon application of sufficient torque to the input member I (clockwise, FIG. 3) to raise the load connected to the output member O, the ends of the cross pin 31 come into abutment with slot-end surfaces 33, thereby (through the intermediary of the output member sleeve portion 24 and spring toe and keyway connection 27, 28) contracting the coils O' at the leftward end of the stationary drum surface 22 sufficiently to release the spring 30 from locking contact with the stationary drum surface 22. This operation is permitted by deflection of the transitional coil portion T' to such extent that, notwithstanding the then existing tendency of the input member, via transitional coil portion T', to expand the spring coils at the rightward end of the spring 30 into locking contact with the stationary drum surface 22, the coils O' are nevertheless deenergized from the opposite end to the extent necessary to permit slippage of the spring 30 in the clockwise direction.

The load lifting or clockwise direction of operation (FIG. 3) tends to cause the reduced diameter control coil portions I' of the spring 30 to overrun on input control surface 10. If sufficient overrun should occur, then the cross pin 31 would be moved against its abutment surfaces 33, but without having caused more than negligible deflection (expansion) of the transitional coil portion T'. Therefore, upon discontinuation of application of torque clockwise to the input shaft I, there would be no stored energy in the transitional coil portion effective to move the cross pin 31 back to its initial or neutral full-line-illustrated position, FIG. 3, or away from the abutment surfaces 33 to a material extent. That condition of affairs would not interfere with a subsequent load-lowering or counterclockwise operation which merely contracts the spring 30 to deenergize it from locking contact with the stationary drum surface and it would not interfere with further lowering of the load.

However, with the cross pin lying directly adjacent the abutment surfaces 33, and assuming there is any force tending to restrain free counterclockwise angular movement of the input shaft I, the ability of load-applied torque to re-expand and reseat coils O' of the spring tightly against the fixed drum surface 22 (which operation would require some retrograde or counterclockwise movement of the input shaft or member I following a load raising operation) would be reduced by an amount generally proportional to the force restraining retrograde movement of the input shaft, and consequently the static load which could be supported by no-back operation of coils O' as expanded by load imparted torque against the stationary drum surface 22 would be reduced or limited. It will be evident that once the cross pin 31 had become seated against the abutments 33 of the slots 32 under static conditions (no motion) there would be no way in which the cross pin could be repositioned (short of disassembling the coupling) because clockwise turning of the input shaft I is the locking direction of control coils I' on the control drum surface 10.

Elastic preloading of the control coil portion I' on input drum surface 10 can always be sufficient to prevent slippage or overrunning such as mentioned at the beginning of the next preceding paragraph, but as a further safeguard the free end coil portion 34 FIG. 4 of the helical spring can be positively fastened after assembly of the spring onto the input and output elements. Preferably, however, the spring terminus would be made to have a ratchet-like connection with the drum surface 10. For example, the entire drum surface 10 can inexpensively be serrated as at 35 FIG. 4, and the free end coil portion 34 of the spring 30 correspondingly diverted out of its normally formed position (i.e. bent inwardly as at 36) providing a tooth to engage one of the serration teeth. Provision of such serration teeth as compared to provision of a smooth drum surface 10 increases the static unit pressure of the coils I' on the input drum thus providing a still further or alternate safeguard against slippage of control coils I' out of place during the operation of lifting the load.

UDNB and ratchet coupling unit B

Referring to FIGS. 5 and 6, the unit B functions both as a UDNB and as a means for enabling ratchet action as of a handle or crank 44 through any selected stroke range position and any desired increments of input operation and to enable both raising and lowering operations to be performed by such handle or crank. As shown in FIG. 5, the coupling B is conditioned for ratchet action.

Outer input member $I^2$, corresponding essentially to input member I of FIG. 1, is turnably supported in fixed housing $S^2$ as by engagement of a disc portion 40 of the input member $I^2$ with a counterbore surface 41 in the fixed housing. Input member $I^2$ has a control drum surface 10', corresponding essentially to the drum surface 10 of input member I of FIG. 1, and an exposed axially extending lug 42 for engagement by a mating recess 43 in the hub of the crank 44.

Crank 44 carries a diametrally slidable pin 45 shown in FIG. 5 as seated in a mating slot 46 in the right hand end of ratchet action inner input member $I^3$. Input member $I^3$ is shown supported by a bore 50 in input member $I^2$ and has a relatively enlarged clutch drum surface 51. The outer peripheral surface 52 of an inner sleeve portion 24' of output part 15' is in axial alignment with drum surface 51 of input member $I^3$. Drum surfaces 51 and 52, just above mentioned, are enveloped by a contracting-to-grip type ratchet clutch spring 54 which may be full floating on the drum surfaces but which, as shown, is positively anchored at one end to the output member part 15' as by a toe portion 55 of the spring 54. The coils of the clutch spring 54 which envelop input drum 51 are elastically preloaded thereon for self energizing and overrunning action as is common in spring clutches of the indexing type.

It will be apparent from FIG. 5 that when the crank 44 is turned in a counterclockwise direction as viewed by an operator at the rightward end of coupling B, the clutch spring 54 will be contracted onto the drum surfaces 51 and 52 to drive the output member $O^3$, and that when the crank is turned in the opposite direction the clutch drum surface 51 overruns in its associated spring coils. During the idle clockwise strokes of crank 44 the load is prevented from lowering by operation of helical no-back brake spring 56 which, as shown, is operatingly similar to spring 30 of the construction according to FIG. 1 and, as shown in FIG. 6, is wound oppositely of ratchet spring 54 (i.e. left hand).

No-back spring 56 has its principal generally cylindrical coils O'' elastically preloaded against the internal drum surface 22' of stationary housing $S^2$. Others of the same group of coils are preloaded against the internal drum surface 26' of outer part 16' of output member $O^3$ and a lug or toe 57 of spring 56 serves as a key between parts 15' and 16' or as described above with reference to FIG. 1. The transitional coils T'' of spring 56 are made as described above with reference to spring 30, and the control coils I'' are elastically preloaded against the external control drum surface 10' of input member $I^2$ to an extent that will insure self energization of coils $I^2$ on control drum surface 10'.

When the pin 45 of crank 44 is withdrawn from the axially open slot 46 of input member $I^3$ (see FIG. 6) an inner end portion 45' of the pin is retained by an overhanging shoulder 44' of the crank hub so that with the hub shifted to the left as in FIG. 6 to permit engagement of the lug and recess 42, 43 the pin is prevented from inward movement by an imperforate portion of the input shaft $I^3$, and the crank 44 is thereby disconnected from the input shaft. With the crank in the position shown in FIG. 6 clockwise operation of the crank causes the control coil I'' to be seated more firmly on the clutch drum surface 10', and meanwhile deenergizes the coils O'' which are in contact with braking surface 22'' to permit lowering of the load. Turning of the crank in the opposite or counterclockwise direction with the crank positioned per FIG. 6 would cause the input control drum surface 10' to overrun relative to the control coils I''. The operator can raise the load only when the crank and pin 45 are in the FIG. 5 illustrated position.

BDNB unit C

Referring to unit C as shown by FIGS. 7 and 8, the input shaft assembly $I^4$ is represented principally by a shaft portion 59 arranged for angular limited movement relative to hollow output shaft or member 60 constituting the principal part of output assembly $O^4$. The input shaft 59 extends in telescoping relation to the shaft 60 in a central bore 61 thereof. Output shaft 60 carries at or near end portions thereof and rigid therewith sleevelike hubs or collars 62 and 64 coaxial with the shaft 60.

Normally stationary drum member $S^3$ is a generally cylindrical sleeve coaxial with output shaft 60 in surrounding radially spaced relationship thereto and situated between and directly adjacent to the hubs or collars 62 and 64. The external diameters of the hubs or collars 62 and 64 are approximately the same as the larger external diameter portion of stationary drum member $S^3$ and the entire unit C (e.g. in an installation adapted for steering) fits inside of a fixed tubular housing, not shown, and to which drum member $S^3$ is preferably detachably connected as by a latch or pin entering a radial opening such as 65 in the drum member. Hub or collar 62 is secured to output shaft 60 by a flanged fitting 66 fastened to the members 60 and 62 as by screws. Hub or collar 64 is secured to a relatively reduced diameter or sleeve portion 68 of output shaft 60 by a flanged tubular fitting 70 around and supporting the input shaft 59 and having a lug and slot connection 71 with the sleeve portion 68 as shown by broken lines in FIG. 7. The flange portion of fitting 70 is shown secured to output hub or collar 64 by screws.

As shown by comparison of FIGS. 7 and 8 the input shaft 59 and the reduced diameter sleeve portion 68 of shaft 60 are interconnected for relative limited angular movement by a cross pin 74 seated tightly in a cross bore 75 of the input shaft. End portions 76 and 76' of the cross pin are movable angularly in elongated slots 77 and 78 of output shaft sleeve portion 68. Circumferential end portions of the slots form limiting abutments for contact by the cross pin end portions 76 and 76' so that the cross pin 74 can move out of its neutral or full-line-illustrated position into two angular-motion-limiting positions such as shown by broken lines at 74x and 74y, as determined by the direction of operation of the input shaft 59. The outermost ends of the pin 74 extend snugly into respective radial openings in a control sleeve 80 which is freely turnable on output shaft sleeve portion 68.

The helical no-back brake springs 82 and 84 are similarly wound (e.g. right hand) and are of identical generally cylindrical form, as manufactured, with the exception of proximal or relatively adjacent control coil portions 83 and 85 of respective springs which portions, as formed, have much smaller diameters than any of the remaining coils. The control coils 83 and 85 of the two springs are heavily preloaded against the control sleeve 80 and each spring has free and gradually expanding diameter transitional coils connecting the control coils to the main coils or in other words operating the same as do the transitional coils T' of FIG. 1 and T" of FIG. 5. Other coils of the springs as in the previously described construction are in bridging relation to drum surfaces of the output hubs or collars 62, 64 and associated portions of the stationary drum member S³. Several end coils 86 and 87 of respective springs are especially heavily preloaded against relatively reduced diameter internal drum surfaces of the respective hubs or collars. The springs 82 and 84 have no toes or lugs but the coils 86 and 87 in reference to the output hubs or collars 62 and 64 and the control coils 83 and 85 in reference to the input control sleeve 80 serve essentially as anchors.

In the normal or non-torque-transmitting condition of BDNB unit C the cross pin 74 is held yieldingly in the neutral position intermediately of the ends of elongated slots 77 and 78 by the relaxed transitional coil portions of the two springs. Assuming no torque is being transmitted to input shaft 59, the output member or assembly O⁴ is locked by the two springs against angular movement relative to the fixed housing member S³ as will be evident. When the input shaft 59 is turned in a clockwise direction the initial operation of the cross pin and control sleeve 80 acting through the control and transitional coils is to deenergize the rightward helical spring 84 in reference to the stationary drum member S³, so that torque is immediately effective on the output member assembly O⁴, through spring 84 tending to turn that assembly clockwise. Meanwhile, the control coils 83 of leftward spring 82 are tending to expand the coils of that spring more firmly into contact with the fixed braking surface of member S³, but as soon as the pin 74 reaches its position 74y, FIG. 8, clockwise torque is imparted to the main coils of spring 82, sliding them in the fixed member drum surface exactly as occurred in the case of coupling A, FIG. 1. The BDNB coupling C, being essentially bisymmetrical about the axis of the cross pin 74, operates for counterclockwise input movement the reverse of the manner just described.

When the transitional coils of springs 82 and 84 return the cross pin 74 to its neutral position, FIG. 8, it is important that the transitional coils be completely relaxed, for otherwise the spring which is contracted by operation of the control sleeve in a particular direction will have a tendency to reduce the braking power of that spring under static conditions. One way of making the coupling less prone to have more holding power in one direction than the other (see FIG. 8A) is to provide separate control collar elements for each of the two springs and with some free angular play between them. Such a two part control collar is shown in FIG. 8A. Collar part 80a (embraced e.g. by control coils 83) is fixed to the cross pin 74 and has lost motion abutment surfaces 80c juxtaposed with mating surfaces of collar part 80b (embraced e.g. by control coils 85).

*BDNB unit D*

BDNB Unit D, FIG. 9, in the particular form shown, is adapted to serve in an outboard motor boat installation for steering. A similar installation is more fully shown in U.S. Patent No. 2,947,278, entitled "Steering Mechanisms for Boats, Tractors and the Like," by J. J. Magill and P. C. Hungerford, Jr.

In FIG. 9 input shaft I⁵, centrally of unit D, is mounted for support and free angular motion for steering in axially spaced apart operatingly integral output hub and sleeve sub-assemblies constituting double drum units 92 and 94, each corresponding generally in construction to the output sub-assembly 15, 16 of FIG. 1 but having additional functions and features as will be pointed out. The normally stationary tubular housing S⁵, partially shown and made in two parts 93 and 93' (for release as in Magill et al. application) lies between double drum units 92 and 94 and is suitably formed or adapted to support those units for turning on the normally upright axis of input shaft I⁵. Outer housing part 93 is suitably supported on the watercraft as by a pivot and clamp device not shown but which may be as fully illustrated in the Magill et al. application.

The output assembly O⁵ of unit D, in addition to the rigid double drum units 92 and 94, further includes the rigid power head and propeller shaft housing 95 of the outboard motor assembly which is only partially shown hereby. The double drum units 92 and 94 are suitably secured together through the intermediary of the housing 95 as though integral therewith and so that there can be no relative angular movements between those double drum units.

The input shaft I⁵ has rigid therewith through suitable means not shown a plural external drum element 96 whose axially opposite ends lie in close relationship to inner clutch drum members or parts 92a and 94a of units 92 and 94. The input shaft I⁵ has suitable bearings in the inner output drum members 92a and 94a and may have an additional (e.g. footstep) bearing not shown in a sleeve 98 which rigidly secures and connects the lower double drum unit 94 to the outboard motor etc. housing 95.

The helical springs of unit D generally identified at 100 and 102 operate selectively as brake and clutch springs. The springs 100 and 102 and their coacting drum surfaces are arranged symmetrically about a horizontal plane bisecting a central control drum portion 99 of the plural input drum member or input shaft portion 96; hence only one of the springs and its coacting drum surfaces need be considered or described in detail except in respect to operation of the coupling. The other (lower) spring and drum assembly portions or elements are usually given the same reference characters as the upper portions but primed. The two springs 100 and 102 are identically wound, i.e. right or left hand, right hand wound springs being assumed in this case.

Referring to the upper helical spring 100, this as formed or manufactured is cylindrical at its main coil portion 104 and is heavily elastically preloaded for anchorage against the internal drum surface 105 of the outer part 92b of unit 92. The spring 100 may also have a toe and slot connection (not shown) with unit 92 such, for example, as previously described (27, 28 in connection with FIG. 1). Spring 100 has other main coils less heavily preloaded against an associated internal brake drum surface 106 of housing part 93'. Control coils 107 of spring 100 are lightly preloaded on external control drum surface 108 of a central portion 99 of plural input shaft connected drum member 96. Drum portion 99 is of considerably less diameter than external drum surfaces 112 and 112' of drum member 96 which lies adjacent the main coils 104 and 104' of the two springs. Transitional coils 109 and 109' of the two springs, as in the previously described constructions, are at all times free from contact with input control drum surfaces and adjacent brake drum surfaces. The inner members 92a and 94a of double drum units 92 and 94 have external drum surfaces 110 and 110' of the same or approximately the same diameters as the external surfaces 112 and 112' of plural input drum member 96. Both pairs of clutching surfaces (110—112 and 110'—112') lie as close as practicable to the internal peripheral surfaces of the main coils 104 and 104' of associated springs.

With the arrangement as just above described, for transmission of input applied torque in one direction to the output assembly O⁵, the spring 100, through energizing action on part of the smaller diameter coils 107 on control surface 108 will be contracted against the drum surfaces 112, 110 to lock the associated input and output members I⁵ and O⁵ together. Similarly, for transmission of input torque in the opposite direction spring 102 is contracted by the energizing action of control coils 107', into gripping contact with the associated external input and output drum surfaces 112' and 110'. Further, in operation (again assuming right hand wound springs 100 and 102) it will be evident that as the input shaft I⁵ is turned in the clockwise or arrow-indicated direction the external control drum surface 108 will simply overrun in reference to control coils 107 in which case the main coils of spring 100 remain seated on their coacting internal drum surfaces 105 and 106; but that the control coils 107' tend to contract more tightly on the control drum surface 108' thereby through the intermediary of the transition coils 109' contracting the main coils 104' of spring 102 away from the internal drum surfaces 105' and 106' and seating those same main coils against the external clutch drum surfaces 112' and 110' for turning the output assembly O⁵ in the clockwise direction. Meanwhile, since torque is being transmitted through the upper end of main coils 104 of spring 100 in the direction to contract that spring, and the transition coils 109 can permit the necessary relative movement between the main coils of spring 100 and the control coils 107, the spring 100 will be slid in the necessary clockwise direction against the internal stationary drum surface 106.

The BDNB coupling mechanism D being symmetrical end for end obviously operates in the same manner as just described to transmit counterclockwise angular movement of the input shaft I⁵ to the output assembly O⁵; and, of course, when no torque is being transmitted to the input shaft, angular motion of the output assembly will be blocked by one spring or the other in locking contact with the internal drum surfaces 106 or 106' depending upon which direction of attempted turning by the output assembly is involved.

We claim:

1. In a no-back coupling, a normally stationary circular drum, relatively angularly movable input and output members coaxial with the drum, the input member having a circular control drum surface, a helical friction spring connected at one end to the output member to turn therewith and having coils between its two ends normally in one-way self locking frictional contact with the stationary drum, the spring having at least one coil at its opposite end in one-way self locking frictional contact with said control drum surface of the input member in such direction that angular movement of the input member tending to increase the locking contact pressure of the spring on said control drum surface will tend to cause said coils of the spring in contact with the normally stationary drum to overrun on that drum.

2. A no-back coupling according to claim 1, wherein a transitional coil portion of the spring between a coil in locking contact with the stationary drum and a coil in locking contact with said control drum surface respectively is free from contact with the stationary drum and control drum surface.

3. A no-back coupling according to claim 2, wherein the transitional coil portion of the spring is of gradually expanding radial dimensions circumferentially of the axis of the spring.

4. A no-back coupling according to claim 2, including a positive torque transmitting connection between the input and output members operative to enable but limit angular relative movement between those members in the direction opposite from the direction of input-member-movement tending to cause the spring to overrun on the stationary drum, whereby the output member, through its connection with said one end of the spring, causes overrun of the spring on the stationary drum.

5. A no-back coupling according to claim 1, including an additional input member and an additional helical spring coaxial with the earlier mentioned input member and spring, the additional spring having portions respectively in one-way self locking relationship to axially adjacent drum surface portions of the output member and additional input member, the additional spring being of opposite hand or helical form relative to the earlier mentioned spring and being arranged to overrun on is associated drum surface portion of the additional input member, and means selectively operatingly engageable with the two input members for turning them at different times.

6. A no-back coupling according to claim 2 wherein peripheral gripping portions of the spring, corresponding in position radially of the spring's axis to the surface portions of the spring which are in one-way locking contact with said drum surface of the input member, are normally out of gripping contact with respective radially closely adjacent drum surface portions of the input member and output member and are arranged to be brought into gripping contact therewith as a function of predetermined relative angular movement of the input and output members in the direction tending to cause the spring to overrun relative to the stationary drum.

7. A no-back coupling according to claim 1, wherein the output member has a circular drum surface portion, the connection between the spring and the output member includes peripheral coil surface portions of the spring corresponding in position, radially of the spring's axis, to the coil surfaces which are in one-way locking contact with the stationary drum, said peripheral coil surface portions being in elastically preloaded torque transmitting relationship to said drum surface portion of the output member.

8. A no-back coupling according to claim 7, wherein said connection further includes an axial toe or lug integral with the spring and disposed for abutment with relatively circumferentially opposed surfaces of the output member closely adjacent to the toe or lug.

9. A no-back coupling according to claim 8, wherein the output member comprises two coaxial parts with circular peripheral surface portions in mating contact with each other, and each of said parts carries a portion of an axial socket receiving said toe or lug portion of the helical spring.

10. In a no-back coupling, coaxial input and output members having respective abutment surfaces providing a limited lost motion torque transmitting connection between them, a stationary member having a brake drum surface, the input member having a control drum surface, one of the drum surfaces being external and the other internal, a helical friction spring having a portion between its ends elastically preloaded on the braked drum surface, and an end coil portion elastically preloaded on the control drum surface, means connecting the opposite end of the spring to the output member for causing the spring to slip in one direction on the stationary drum surface when the abutment surfaces are brought into contact by torque applied to the input member, the spring having a free or a transitional coil portion out of contact with both the internal and external drum surfaces and functioning to hold the abutment surfaces in a predetermined angularly spaced relationship when no torque is being transmitted through the coupling.

11. The coupling according to claim 10, wherein the control drum surface in contact with said end coil portion is serrated to increase the static unit pressure of said end coil portion thereon.

12. The coupling according to claim 11, wherein said end coil portion of the spring has a tooth engaging one of the serrations in a direction to assist in preventing overrun of the spring on the control drum surface.

13. A bidirectional no-back coupling comprising a normally stationary drum, input and output members coaxial with the drum and connected for limited angular relative movement, a pair of helical springs each connected at one end thereof with the output member and normally in one-way frictional locking contact with the stationary drum and effective to block angular movement of the output member in the opposite direction, relatively opposite end coil portions of the springs being in elastically preloaded relationship to respective control drum surfaces on or carried by the input member, adjacent transitional coil portions of each of the springs being completely out of contact with the drum surfaces of the input member and with the brake drum surface so as yieldably to oppose relative angular movement between the inut and output members while permitting such relative angular movement.

14. The coupling according to claim 13, wherein a cross pin in the input member projects through circumferential slots in a sleeve portion of the output member to provide the limited angular movement connection between the input and output members, and the control drum surface of the input member is carried by a sleeve or collar around the sleeve portion of the output member and connected to the cross pin to turn therewith.

15. The bidirectional no-back coupling according to claim 14, wherein the sleeve or collar is in two parts one only of which is connected to the cross pin, said parts each providing control drum surfaces for contact with respective helical springs, the two parts being loosely connected together for relative limited angular movement therebetween.

16. A bidirectional no-back coupling comprising a normally stationary drum, input and output members coaxial with the drum, a pair of helical springs normally in one way locking frictional contact with the drum and each having one end thereof operatively connected to the output member to turn therewith, a coil portion at the opposite end of each spring being preloaded on associated control drum surface portions of the input member in full floating relationship thereto and two pairs of clutch drum surfaces on the input and output member in position to be one way lockingly engaged by peripheral surface portions of the respective springs other than the surface portions thereof which engage the stationary drum.

References Cited in the file of this patent

UNITED STATES PATENTS

| | | |
|---|---|---|
| 933,866 | Weickel et al. | Sept. 14, 1909 |
| 1,203,528 | Gardner | Oct. 31, 1916 |
| 1,521,583 | Whitcomb | Dec. 30, 1924 |
| 1,847,867 | Dodge | Mar. 1, 1932 |
| 2,372,693 | Swift | Apr. 3, 1945 |
| 2,598,993 | Gorske | June 3, 1952 |
| 2,643,750 | Moulton | June 30, 1953 |
| 2,885,896 | Hungerford et al. | May 12, 1959 |
| 2,922,220 | Sacchini | Jan. 26, 1960 |